(12) United States Patent
Griesing et al.

(10) Patent No.: US 8,718,122 B2
(45) Date of Patent: May 6, 2014

(54) TESTING PERFORMANCE OF A WIRELESS DEVICE

(75) Inventors: John Robert Griesing, Sudbury, MA (US); Charles R. Wright, Winchester, MA (US)

(73) Assignee: Azimuth Systems, Inc., Acton, MA (US)

( * ) Notice: Subject to any disclaimer, the term of this patent is extended or adjusted under 35 U.S.C. 154(b) by 510 days.

(21) Appl. No.: 13/030,448

(22) Filed: Feb. 18, 2011

(65) Prior Publication Data

US 2011/0200084 A1    Aug. 18, 2011

Related U.S. Application Data

(60) Provisional application No. 61/305,760, filed on Feb. 18, 2010.

(51) Int. Cl.
*H04B 3/46* (2006.01)
*H04B 17/00* (2006.01)
*H04Q 1/20* (2006.01)

(52) U.S. Cl.
USPC .......................................... 375/224; 375/231

(58) Field of Classification Search
USPC ....................................................... 375/224
See application file for complete search history.

(56) References Cited

U.S. PATENT DOCUMENTS

| | | | |
|---|---|---|---|
| 5,757,194 A * | 5/1998 | Yun | 324/627 |
| 2011/0230143 A1* | 9/2011 | Lundstrom et al. | 455/67.11 |
| 2011/0263215 A1* | 10/2011 | Asplund et al. | 455/115.1 |
| 2012/0206304 A1* | 8/2012 | Clow et al. | 343/703 |

\* cited by examiner

*Primary Examiner* — Erin File
(74) *Attorney, Agent, or Firm* — Anderson Gorecki & Rouille

(57) ABSTRACT

Improved performance testing of a wireless device is disclosed. The system is particularly suited to testing devices having multiple antennas. The device under test (DUT) is placed in a reverberation chamber with antennas for transmission of a test signal to the DUT. The number of antennas deployed in the reverberation chamber and placement of those antennas is selected such that no line-of-sight transmission component exists from test system antenna to DUT antenna, and the number of antennas deployed in the reverberation chamber is greater than the spatial rank of the signal. The antennas are driven by a programmable channel emulator capable of generating fading, correlation, delay, Doppler and other channel condition phenomena. Furthermore, the antennas are driven individually by a plurality of independent fading processes. The combination of the programmable channel emulator and reverberation chamber creates a multipath environment which simulates signals arriving from different locations, with different delays, as well as the simulation of device motion. The system also includes instruments to produce test signals and to measure the performance of the DUT.

39 Claims, 4 Drawing Sheets

TESTING PERFORMANCE OF A WIRELESS DEVICE

CROSS-REFERENCE TO RELATED APPLICATIONS

This application claims priority to U.S. Provisional Patent Application 61/305,760, titled TESTING PERFORMANCE OF A WIRELESS DEVICE, filed Feb. 18, 2010.

BACKGROUND OF THE INVENTION

The present invention is related to testing performance of wireless devices. Mobile phones, PDAs, tablet computers, and laptop computers and other wireless devices are widely used. Such devices typically communicate with a wireline computer network via an base station or cell tower, thereby allowing mobility. Various improvements in wireless technology have enabled wireless devices to be built in a smaller form factor with increased throughput and computing power. Testing is performed to mitigate the risk that devices will fail to perform as planned because the costs associated with developing, purchasing, selling and deploying a new wireless technology or products are often quite high. However, wireless device performance is notoriously difficult to predict because it can be affected by many factors. The different conditions to which a wireless device may be subjected in actual use is so great in number that it is difficult and time-consuming to create all of those conditions in a test environment.

It is known to perform open-air testing by manually moving a wireless device under test (DUT) through an open air test environment such as drive testing to predict performance. However, this technique is too labor intensive and imprecise to simulate a wide variety of traffic conditions, distances between devices and rates of motion in a practical manner. Further, such a manual, open-air test can be rendered invalid by transient interference from a microwave, RADAR or other RF source.

It is also known to perform over-the-air (OTA) testing in an anechoic chamber. Channel emulators can be used to create conditions such as delay, Doppler, and correlation. A number of antennas mounted within the chamber are used to transmit signals from the channel emulator to the DUT. This has the advantage of being a more controlled environment than an open air test. However, anechoic chambers are relatively large and costly. The techniques required to produce the channel conditions may also require a large number of channel emulator electronics and antennas. Additionally, calibration of such a system and performing isotropic measurements in such a system are typically very time consuming.

It is also known to perform OTA testing in a reverberation chamber. The reverberation chamber has walls that reflect electromagnetic waves so a signal transmitted within the chamber tends to reverberate, creating standing waves with randomly located peaks and nulls. Moveable mechanical devices called "stirrers" are used to change the location of the peaks and nulls. However, mechanical systems are not well suited to providing Doppler conditions similar to those experienced by an actual DUT in fast motion, such as in an automobile or train, due to the speed limits of the stirrers. Furthermore, the average chamber impulse response is a simple decaying exponential, which is very different from actual channel conditions in which the average channel impulse response is produced by a number of discrete, physically separated reflectors. Consequently, reverberation chambers are generally limited to reproducing conditions of low Doppler frequencies and simple decaying exponential power delay profiles or for testing that does not require realistic channel conditions.

It is also known to perform "conducted testing" to simulate a wireless environment. Conducted testing can be performed by bypassing the DUT antenna with direct wired connections to the DUT. The DUT is typically enclosed in an EMI-shielded container, and a channel emulator is used to create conditions such as delay, Doppler, and correlation. This technique has the advantage of being less costly than an anechoic chamber and having the capability for creating a greater range of conditions than a reverberation chamber. However, conducted testing also has some drawbacks. For example, it may be necessary to disassemble the DUT in order to bypass the antenna. Furthermore, as will be explained in greater detail below, bypassing the antenna may compromise the value of the test results as the device is not tested in the same form it will be sold or used.

Recent advances in wireless technology present even more difficult challenges to designers of test systems. One example is multiple input, multiple output (MIMO) systems. MIMO systems increase throughput using a combination of antenna design, radio design and baseband signal processing design. Although each subsystem separately affects performance and reliability, coordinated operation of the subsystems is generally required to achieve best results. Historically, conducted testing is typically performed to measure the performance of the radio and baseband processing subsystems, and OTA testing is performed to measure the performance of the antenna subsystem. OTA testing to determine the performance of the antenna subsystem may include evaluation of parameters such as total isotropic sensitivity (TIS) and total radiated power (TRP). However, coordinated operation of all the subsystems, in conjunction with the expected conditions the device will be operated in (RF fading channel conditions), and measuring performance based on a figure of merit that the end user directly experiences, such as data throughput, is very desirable for data devices and MIMO devices that are designed to offer enhanced throughput.

SUMMARY OF THE INVENTION

In accordance with an aspect of the invention, apparatus for testing a wireless device with at least one antenna comprises: a signal transmission emulator which transmits test signals; a channel emulator which operates on test signals from the signal transmission emulator to cause the test signals to exhibit channel conditions; and a reverberation chamber including multiple antennas which are driven with the test signals from the channel emulator which exhibit channel conditions, wherein the driven antennas deployed in the reverberation chamber are greater in number than spatial rank of the signals, the signal from the multiple antennas being received by the at least one antenna of the wireless device under test.

In accordance with another aspect of the invention, a method for testing a wireless device with at least one antenna comprises: generating test signals; causing the test signals to exhibit channel conditions; driving multiple antennas in a reverberation chamber with the test signals which exhibit channel conditions, wherein the antennas are greater in number than spatial rank of the signals, the signals from the multiple antennas being received by the at least one antenna of the wireless device; and analyzing wireless device signal data responsive to the test signals which exhibit channel conditions to determine a metric.

The use of a reverberation chamber together with a channel emulator for OTA tests provides an advantage over prior art technology because the resulting test system is less costly that an anechoic chamber test system and has greater capability than a mechanical system based on a reverberation chamber alone. Additionally, evaluation of device performance may be achieved with a less time consuming process allowing more efficient test of the devices. Operation of the reverberation chamber with the channel emulator is enabled by using the channel emulator to drive multiple antennas within the reverberation chamber, wherein the number of antennas being driven is greater than the spatial rank of the signal structure. Furthermore, the antennas are driven individually by a plurality of independent fading processes in order to create a more Gaussian process at the DUT and reduce limitations of capacity due to keyhole effects or non-Rayleigh fading statistics.

A related advantage is the ability to evaluate performance of a mobile device in its native form including all major subsystems, e.g., testing the radio design, baseband signal processing, and device antennas together. This is made possible because the test is an OTA test with the variety and range of conditions that emulate the actual environments in which the device will be operated. This is an improvement over systems that test, for example, radio design and baseband signal processing and adjust those results in view of theoretical or separately evaluated antenna performance.

Another advantage is that the drive antennas may be selectively oriented in the test chamber to create channel conditions, such as Rayleigh or Ricean fading. For example, the antennas may be deployed such that no line-of-sight transmission component exists from the test system antennas to the DUT antennas. In one embodiment this is accomplished by positioning the test system antennas such that signals are directed away from the DUT, e.g., into the corners of the test chamber. In another embodiment the antennas are positioned such that a line-of-sight transmission component exists from the test system antennas to the DUT antennas.

Another advantage is that the reverberation chamber in this solution can be smaller than a reverberation chamber without the use of a channel emulator solution as the channel emulator electronics driving a large number of antennas can be used to create the statistical Rayleigh fading. Without the use of these components, the chamber must be physically larger to create a statistically Rayleigh environment.

Another advantage is the statistical purity of the Rayleigh fading as compared to the reverberation chamber without channel emulator solution.

Another advantage is the rate of fading or Doppler. The reverberation chamber without channel emulator solution has a Doppler limited by the mechanical movements, and the Doppler spectrum is not controlled.

DETAILED DESCRIPTION

Some aspects of the invention may be implemented by one or more computer programs. Such computer programs are stored in non-transitory computer-readable memory and executed by processing hardware in apparatus described below to perform functional steps such as those described below.

Figure 1:
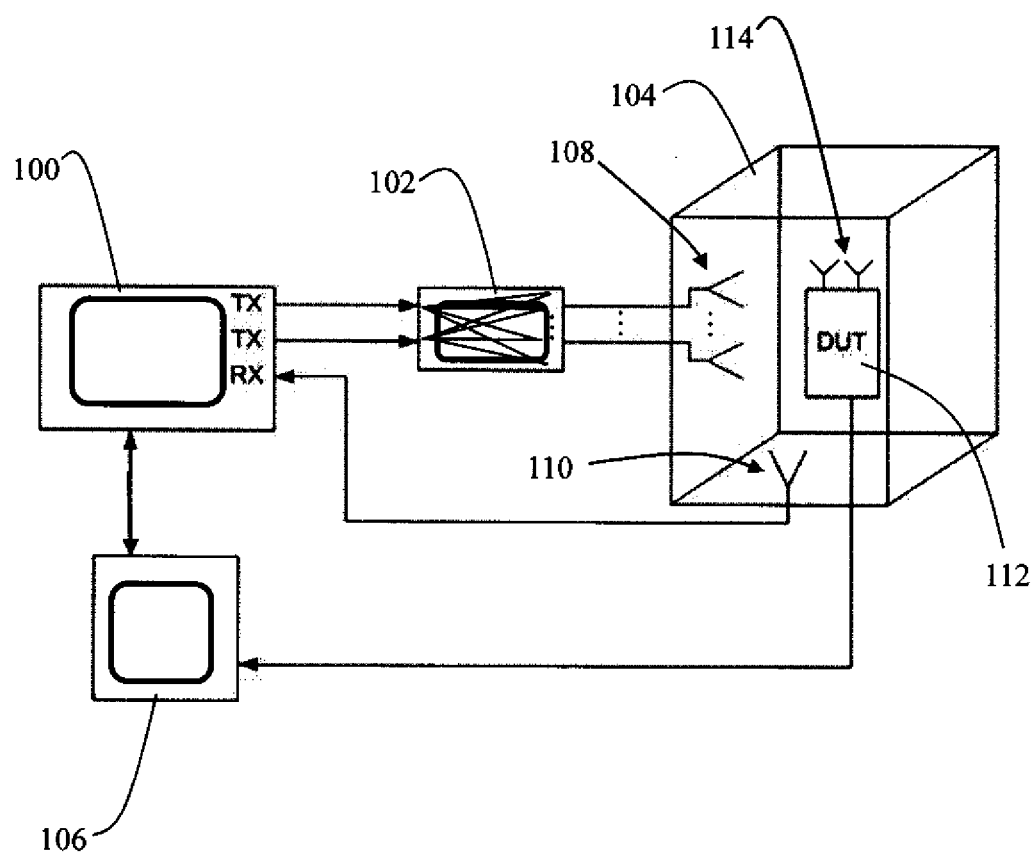
FIG. 1 illustrates a system for testing performance of a wireless device.
Figure 2A:
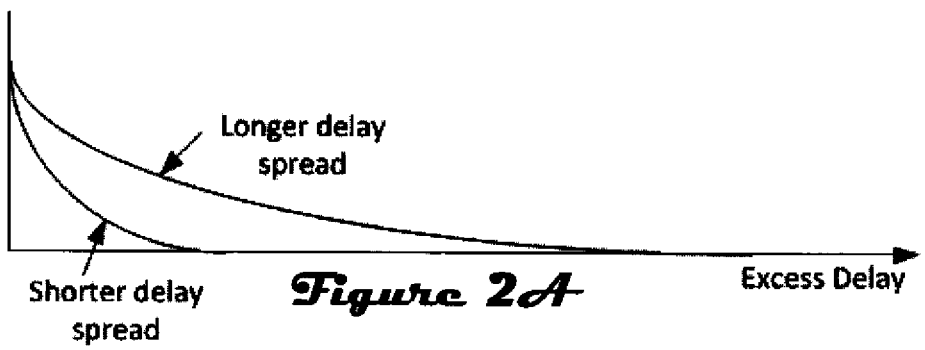
FIGS. 2A, 2B and 2C illustrate, respectively, delay profiles for the reverberation chamber alone, the reverberation chamber with the channel emulator, and the reverberation chamber with channel emulator driving a number of antennas greater than the spatial rank of the signal structure with independent fading processes.
Figure 2B:
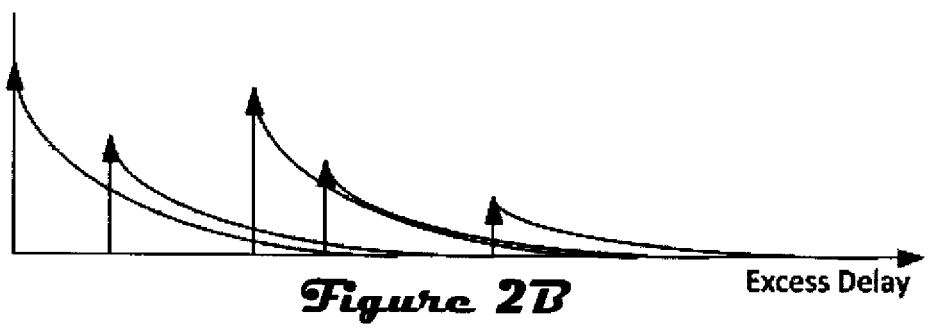
Figure 2C:
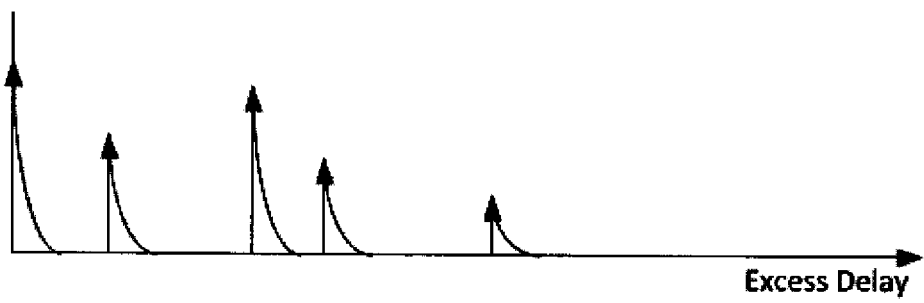

FIG. 1 illustrates an OTA test system in accordance with an embodiment of the present invention. The system includes a signal transmission emulator 100, a channel emulator 102, a test chamber 104, and a performance metric measurement module 106. The signal transmission emulator 100 transmits signals to the channel emulator 102. The channel emulator 102 operates on the signals from the signal transmission emulator 100 and transmits a corresponding output signal into the test chamber 104 via antennas 108. A sniffer antenna 110 associated with the test chamber provides a return signal from a DUT 112 to the signal transmission emulator 100, when necessary. Parameters captured from or by the DUT 112 related to the performance metric, such as data rate or throughput, are provided to the performance metric measurement module 106. However, it should be noted that the measurement module 106 is not present in every embodiment. The signal transmission emulator may also provide a signal to the performance metric measurement module. The functions performed by these components are described below.

The signal transmission emulator 100 functions to provide signals to the channel emulator 102. The signal transmission emulator may be specialized to emulate a particular device or type of device, or have more general capabilities to emulate the transmission of a signal that is typically received by the DUT or will be received by the DUT in some test mode for the purpose of evaluation. Devices which the signal transmission emulator may emulate or be include, but are not limited to, an actual base station device, a base station emulator, femto or pico cells, or other class of base station device, an access point, an access point emulator, and programmable signal generators.

The channel emulator 102 operates on signals received from the signal transmission emulator 100 to create channel conditions. More particularly, the channel emulator functions in combination with the reverberation chamber to create phenomena necessary for evaluation of the DUT 112. The number of outputs of the channel emulator 102 is greater than the number of TX ports of the signal transmission emulator 100. Furthermore, the outputs of the channel emulator 102 are independently driven by different fading processes which may be random. The fading condition is characterized by multiple copies of the signal constructively or destructively adding and arriving at the DUT, so the different fading processes tend to create a more Gaussian process at the DUT and reduce limitations of capacity due to keyhole effects. The outputs of the channel emulator 102 each drive one of the antennas 108 that are mounted inside the reverberation chamber 104. Programmable channel emulators are now known in the art.

The reverberation chamber 104 includes a door and walls that reflect electromagnetic waves within the chamber. Consequently, a signal transmitted within the chamber tends to reverberate. The reverberation chamber may include moveable mechanical devices such as so-called "stirrers." The stirrers help to create test signals characterized by isotropy or uniform angle of arrival (AoA) relative to the DUT. Simultaneously driving multiple antennas and moving the DUT on a turntable also helps to create an isotropic environment. The reverberation chamber provides limited Doppler based on mechanical movements.

Referring to FIGS. 1 and 2A through 2C, the reverberation chamber provides a single impulse response and exponential decay, but the combination of the channel emulator and reverberation chamber can provide the many responses typically experienced as delayed copies of the reflected transmitted signals, i.e., variable multipath delay elements. The channel emulator 102 can be programmed in such a way as to create specific channel conditions in the reverberation chamber. In the illustrated embodiment the channel emulator is programmed for a specific power delay profile, with each cluster representing a tap in the model. The exponential decay of the cluster reflection can be modeled by the reverberation chamber with the appropriate loading of the chamber. For each path or tap of the power delay profile, a correlation can be programmed via the channel emulator to provide a correlation between signal (driven antenna) paths for each major cluster. The correlation will be dependent on the model including the correlation of the transmitting side. The characteristics of the fading can be programmed in the channel emulator for emulating variable speed of the DUT environment. The fading of the channel emulator is mapped such that the combined process of the channel emulator and reverberation chamber provide fading that closely statistically matches that of a desired model. Furthermore, the fading created by the channel emulator is selected to be dominant as compared to that of the reverberation chamber, e.g., where the velocity of fading is X then chamber fading is a small fraction of X. The channel emulator also provides controlled correlation as presented to the DUT by imparting a "transmit side" correlation, controlling the multipath delay pattern at the DUT, and creating a Power Delay Profile.

Figure 3:
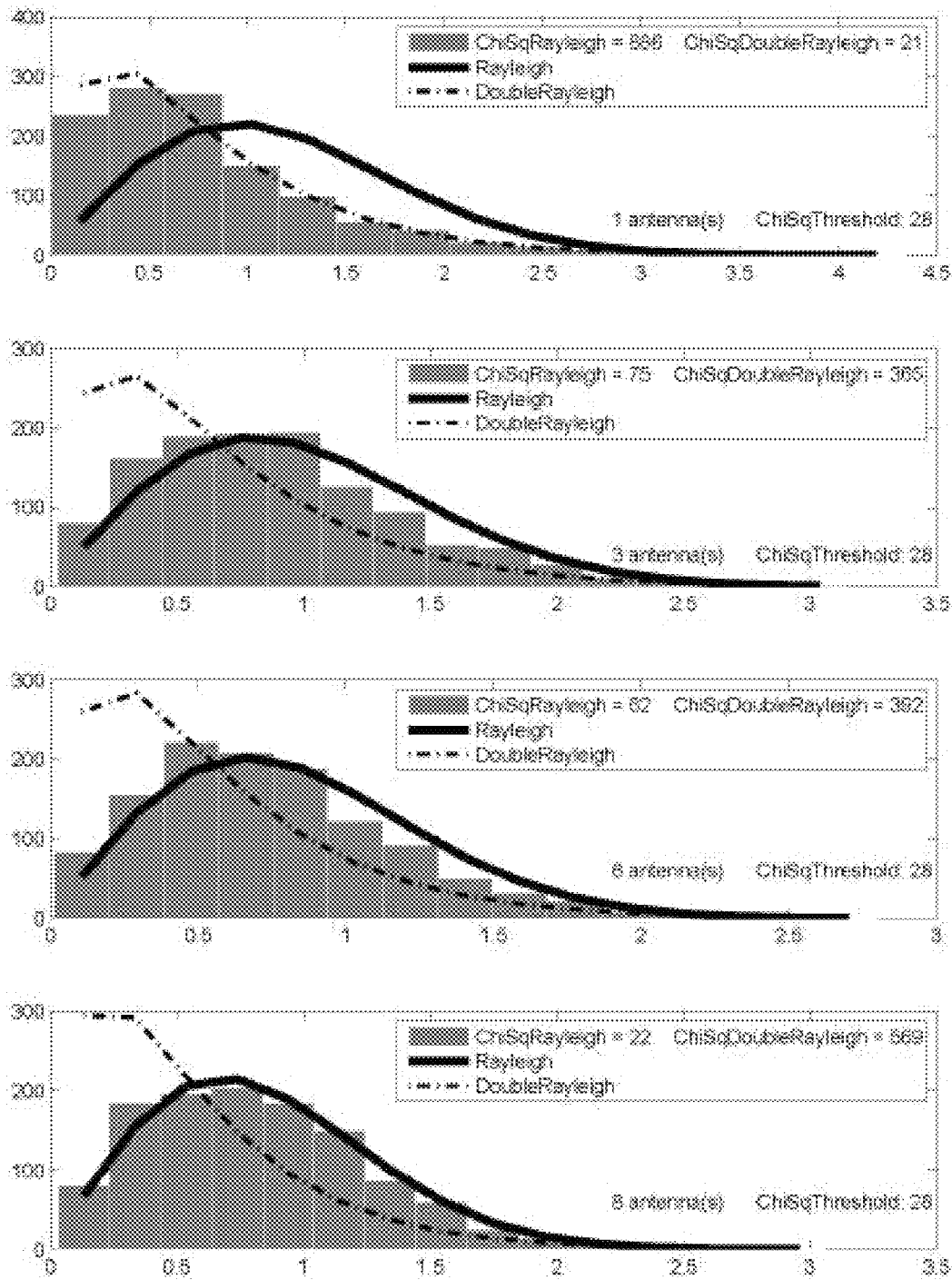
FIG. 3 illustrates simulations with different numbers of independently driven antennas.
Figure 4:
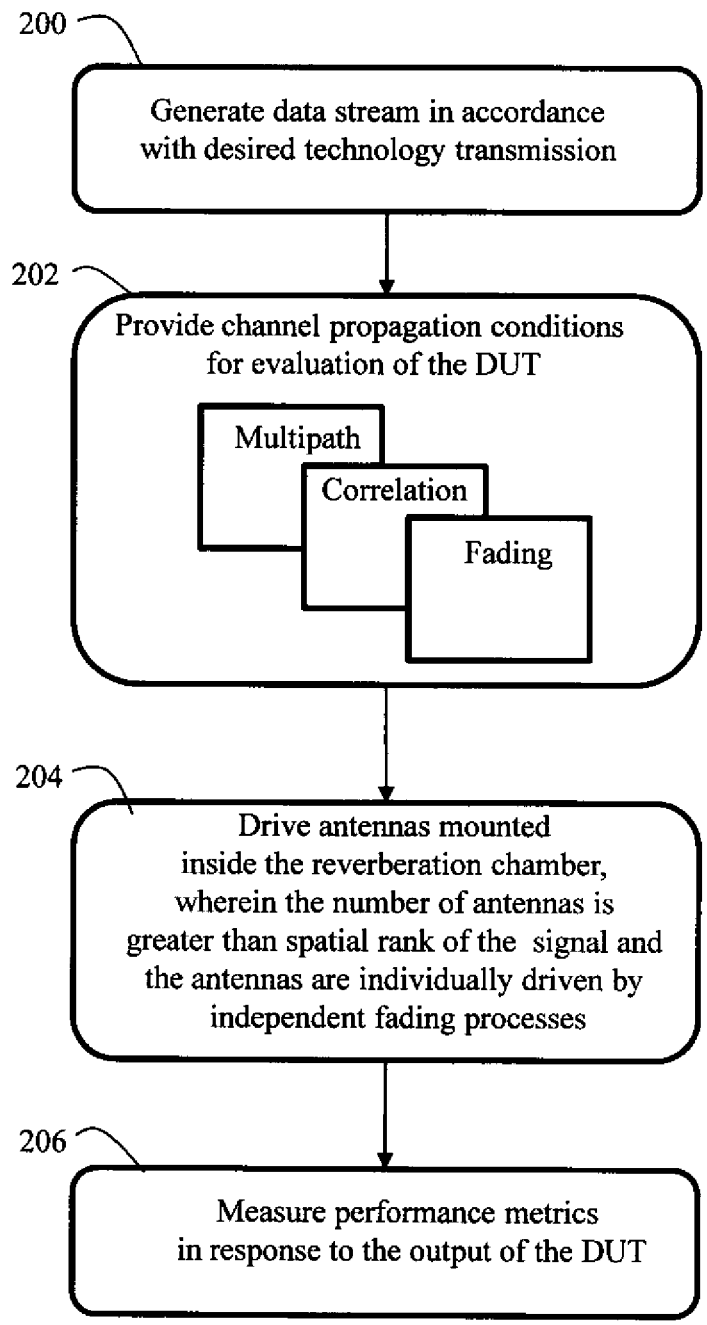
FIG. 4 illustrates a method for testing performance of a wireless device.

Referring to FIGS. 1 and 3, the number of antennas 108 deployed in the reverberation chamber 104 and placement of those antennas 108 can be selected to produce a Ricean or Rayleigh (rather than Double Rayleigh) fading. The chamber itself is known to produce Rayleigh fading provided that certain conditions are met related to the size of the chamber and frequency of operation. An electronic channel emulator is known to produce very precise Rayleigh fading. If the two operations are just cascaded, then the result will be a fading with an amplitude distribution that is characterized as Double Rayleigh. A Double Rayleigh distribution is undesirable when characterizing device performance under typical real world channel conditions that are understood to statistically be represented as Rayleigh. The use of multiple antennas paths, greater in number than the spatial rank of the system, that have independent fading paths are shown to randomize the process and produce the desired Rayleigh fading and to practically eliminate reduction of capacity due to keyhole or multi-keyhole effects. It can be seen from the chi-square test data that the fading becomes more Rayleigh as opposed to double Rayleigh as the number of paths is increased. Chi-square is a statistical test commonly used to compare observed data with data expected to be obtained according to a specific hypothesis. A chi-square test resulting in a value of 28 or less is considered to be statistically equivalent. In FIG. 3, the bar graphs represent the captured amplitude data for a number of antenna fading path configurations. A Chi-square test was conducted on each set of captured data for both comparison to Rayleigh amplitude distribution and Double Rayleigh amplitude distribution. The chi-square double Rayleigh value of 21 in the single antenna case indicates a near perfect double Rayleigh amplitude condition. Whereas the chi-square test for Rayleigh with a value of 22 in the eight antenna case indicates a near perfect Rayleigh amplitude condition with the larger number of independent antenna paths. The invention is not limited to a particular number of antennas or paths, but the number of independent fading paths should be greater than the spatial rank of the signal, and corresponding antennas 108 are deployed in the reverberation chamber such that there are one or more fading paths per antenna as provided by the channel emulator. In the illustrated embodiment the signal transmission emulator 100 has two transmit ports, each connected directly to the channel emulator 102. In this case there are more than two antennas 108 which are driven directly by the outputs of the channel emulator. However, in some cases the antennas may be driven through external amplifiers to provide necessary gain to account for all losses of the system. In one embodiment the antennas 108 are deployed such that no line-of-sight transmission component exists from test system antenna 108 to DUT antennas 114 in order to create Rayleigh fading. This is accomplished by positioning the antennas 108 such that signals are directed away from the DUT, e.g., into the corners of the test chamber. Deploying the antennas with a line-of-site transmission component creates Ricean fading In one embodiment the fading process of the reverberation chamber is in some predetermined ratio relative to the fading process of the channel emulator. An automatic control system may be employed such that when a desired fading or Doppler velocity is set, the system adjusts the velocity of the stirrers of the chamber to maintain the ratio. Furthermore, the chamber may be loaded with absorbing material which dampens reverberation such that multipath conditions dominate from the channel emulator. It is also possible to run an automated calibration to determine the exponential decay of the chamber. Decay of the chamber can be mechanically or electronically controlled, e.g., dynamically controlled to adjust decay of the chamber. Furthermore, the channel emulator can be used to send a signal and measure the response of the signal for the purposes of measuring the decay of the chamber.

The performance metric measurement module 106 functions to measure performance metrics in response to the output of the DUT 112. The signal received by the DUT is decoded and the result is analyzed by the performance metric measurement module. This can be accomplished by a conducted link, using an interface available on the DUT. Alternatively, results can be computed and stored in performance analysis software and transmitted over a wireless link, e.g., after a test run is complete. Another alternative is to use an optical link. The data is analyzed and metrics such as throughput, packet loss, and error rate can be determined to evaluate performance and reliability of the DUT in the OTA test system. Channel Quality Information reported by the DUT could also be a performance metric. Other metrics can also be determined based on channel conditions, signal strength, DUT position and other parameters the system is capable of generating. The measured metrics may be stored in non-transitory memory, presented via a display or interface, and provided to the signal transmission emulator.

The signal that is presented to the DUT is received and processed according to the protocol technology of the DUT. An additional "sniffer" antenna 110 may be placed inside the test chamber if it is desirable or necessary for the DUT to respond to the transmission. This antenna 110 receives signals transmitted by the DUT and sends the signals back to the signal transmission emulator 100. In the illustrated embodiment the signal is conducted without a channel emulator in the path. However, a channel emulator may be used to modify the return signal.

Referring now to FIGS. 1 and 3, the OTA test system is particularly well suited to testing MIMO devices. However, it should be understood that the system is not limited to testing MIMO devices. Operation of the OTA test system includes generation of a data stream by the signal transmission emulator or a data stream that is fed to the signal transmission emulator. In either case the signal is processed in accordance with the desired technology transmission and transmitted to the channel emulator as indicated in step 200. The channel emulator provides a statistical representation of channel propagation conditions for evaluation of the DUT as indicated in step 202. Examples of conditions that are created and provided by channel models include multipath, correlation, and fading. Furthermore, the channel emulator provides a number of outputs which is greater than the number of TX ports of the signal transmission emulator, and the outputs of the channel emulator are independently driven by random fading processes. Multiple antennas within the test chamber are driven by those outputs (one or more fading output paths per antenna) to present the conditions to the antennas of the DUT as indicated by step 204. The multipath condition is characterized by multiple copies of the signal being received at the DUT. Moreover, the multiple copies of the signal may be received with variable delays, power and phase. The delay is determined by the environment being emulated, with indoor environments having a total delay spread less than 1 μsec typically, and outdoor environments exhibiting longer delay spreads, up to 10 μsec or more. Standard channel models for conducted testing define power delay profiles. The correlation condition is characterized by how the antenna configurations and channel conditions have caused the fading between signals received at the different receive antennas to be correlated. Correlation depends on multiple factors, including the transmit antennas of the signals, the environment and receiver antennas. Typical models use only three levels of correlation; low, medium and high, but other degree or a specific correlation could be used. The fading condition is characterized by multiple copies of the signal constructively or destructively adding and arriving at the DUT. If the environment and the DUT are fixed, the multipath would also be fixed and the fading would not change over time or frequency, and the received signal would be a fixed level. However, with certain mobile communications, such as cellular, the device may be moving so the fading will change over time. It is this fading that is correlated between the multiple antennas. It is also this fading that produces a Doppler shift effect proportional to the transmission frequency and the velocity of the DUT. Standard channel models define the fading and power spectrum. Cellular mobile communications models use Rayleigh fading with Jakes Doppler spectrum, whereas wireless LAN models use Rayleigh fading with a Bell-shaped Doppler spectrum. The fading as produced across the multiple antenna ports are correlated as defined by the model. Consequently, the signal present at the DUT can be characterized by channel conditions such as multipath (power delay profile) as given by standard models, correlation as determined by the environment and transmitter, and statistical fading with power Doppler spectrum as defined by the standard models or suitable for the evaluation of the DUT performance and reliability. With all such conditions, and perhaps others, such as signal level, the throughput and reliability of the DUT based on operation of all major subsystems may be evaluated in the OTA test system as indicated in step 206. In order to enable evaluation the DUT demodulates the signal and passes the consequent data payload to the measurement module. Additional metrics, such as channel quality indications, received signal strength, reference signal quality, or other such metrics, as computed by the DUT, could be passed on to the metric measurement module, as appropriate for the specific metric being reported. Typical test systems use methods such as IXIA Chariot or publicly available IPerf as a means to generate and receive data streams, although other methods can be used.

While the invention is described through the above exemplary embodiments, it will be understood by those of ordinary skill in the art that modifications and variations may be made without departing from the inventive concepts. Further, while the preferred embodiments are described in connection with various illustrative structures, one skilled in the art will recognize that the system may be embodied in connection with other structures. Accordingly, the invention should not be viewed as limited except by the scope and spirit of the appended claims.

What is claimed is:

1. Apparatus for testing a wireless device with at least one antenna comprising:
   a signal transmission emulator which transmits test signals having a spatial rank;
   a channel emulator which operates on the test signals from the signal transmission emulator to cause the test signals to exhibit channel conditions; and
   a reverberation chamber including multiple antennas which are driven with the test signals from the channel emulator which exhibit channel conditions, wherein the driven antennas deployed in the reverberation chamber are greater in number than the spatial rank of the test signals, the test signals from the multiple antennas being received by the at least one antenna of the wireless device.

2. The apparatus of claim 1 wherein the channel emulator has a greater number of outputs to the driven antennas than inputs from the signal transmission emulator.

3. The apparatus of claim 2 wherein the channel emulator independently drives the outputs with different fading processes.

4. The apparatus of claim 3 wherein the fading processes are random.

5. The apparatus of claim 1 wherein the antennas are deployed in the reverberation chamber such that no line-of-sight transmission component exists from test system antennas to the at least one antenna of the wireless device.

6. The apparatus of claim 1 wherein the antennas are deployed in the reverberation chamber such that there is a line of sight component from at least one test system antenna to the at least one antenna of the wireless device.

7. The apparatus of claim 1 wherein the antennas are deployed in the reverberation chamber such that that signals from the antennas are directed away from the device under test.

8. The apparatus of claim 1 wherein the signal transmission emulator emulates an actual base station device, a base station emulator, a femtocell, a picocell, a class of base station device, an access point, an access point emulator, or a programmable signal generator.

9. The apparatus of claim 1 wherein the channel emulator provides a dominant Doppler source relative to a Doppler source of the reverberation chamber.

10. The apparatus of claim 9 wherein the fading process of the reverberation chamber is in some ratio of the fading process of the channel emulator.

11. The apparatus of claim 10 wherein when a desired fading or Doppler velocity is set, the apparatus adjusts the velocity of a stirring process of the chamber to maintain the ratio.

12. The apparatus of claim 1 wherein the signals emanating from the driven antennas are correlated according to settings in the channel emulator.

13. The apparatus of claim 1 wherein the channel emulator provides a statistical representation of channel propagation conditions for evaluation of the wireless device, wherein the conditions include at least one of multipath, correlation, and fading.

14. The apparatus of claim 1 wherein the chamber includes absorbing material which dampens reverberation such that the channel emulator provides the dominant multipath conditions.

15. The apparatus of claim 1 including automated calibration which determines decay of the chamber.

16. The apparatus of claim 1 wherein decay of the chamber is mechanically or electronically controlled to adjust decay of the chamber.

17. The apparatus of claim 1 wherein the channel emulator is used to send a signal and measure the response of the signal for the purposes of measuring the decay of the chamber.

18. The apparatus of claim 1 wherein signals received by the wireless device are decoded and returned to a performance metric measurement module.

19. The apparatus of claim 18 wherein signal data is analyzed to determine a metric including at least one of throughput, packet loss, error rate, and Channel Quality Information.

20. The apparatus of claim 18 wherein a sniffer antenna inside the test chamber enables the wireless device to respond to the test signal by negating effects of the reverberation chamber on a signal transmitted by the device under test which are undesirable for the test.

21. A method for testing a wireless device with at least one antenna comprising:
generating test signals having a spatial rank;
causing the test signals to exhibit channel conditions;
driving multiple antennas in a reverberation chamber with the test signals which exhibit channel conditions, wherein the antennas are greater in number than the spatial rank of the test signals, the signals from the multiple antennas being received by the at least one antenna of the wireless device; and
analyzing wireless device signal data responsive to the test signals which exhibit channel conditions to determine a metric.

22. The method of claim 21 including independently driving the antennas with different fading processes.

23. The method of claim 22 including independently driving the antennas with random fading processes.

24. The method of claim 21 including deploying the antennas in the reverberation chamber such that no line-of-sight transmission component exists from test system antennas to the at least one antenna of the wireless device.

25. The method of claim 21 including deploying the antennas in the reverberation chamber such that there is a line of sight component from test system antennas to the at least one antenna of the wireless device.

26. The method of claim 21 including deploying the antennas in the reverberation chamber such that that signals from the antennas are directed away from the wireless device.

27. The method of claim 21 wherein generating test signals includes emulating an actual base station device, a base station emulator, a femtocell, a picocell, a class of base station device, an access point, an access point emulator, or a programmable signal generator.

28. The method of claim 21 wherein causing the test signals to exhibit channel conditions includes providing a dominant Doppler source relative to a Doppler source of the reverberation chamber.

29. The method of claim 28 including setting the fading process of the reverberation chamber in some ratio of the fading process of the channel emulator.

30. The method of claim 29 including, when a desired fading or Doppler velocity is set, adjusting velocity of stirring of the chamber to maintain the ratio.

31. The method of claim 21 including correlating the signals emanating from the driven antennas according to settings in a channel emulator.

32. The method of claim 21 including providing a statistical representation of channel propagation conditions for evaluation of the wireless device, wherein the conditions include at least one of multipath, correlation, and fading.

33. The method of claim 21 including loading the chamber with absorbing material which dampens reverberation such that the channel emulator provides the dominant multipath conditions.

34. The method of claim 21 including running an automated calibration to determine decay of the chamber.

35. The method of claim 21 including mechanically or electronically controlling decay of the chamber.

36. The method of claim 21 including using the channel emulator to send a signal and measuring the response of the signal for the purposes of measuring the decay of the chamber.

37. The method of claim 21 including decoding signals received by the wireless device and returning the decoded signals to a performance metric measurement module.

38. The method of claim 32 including analyzing signal data to determine a metric including at least one of throughput, packet loss, error rate, and Channel Quality Information.

39. The method of claim 21 including the wireless device responding to the test signals via a sniffer antenna which negates effects of the reverberation chamber on a signal transmitted by the device under test which are undesirable for the test.

* * * * *